UNITED STATES PATENT OFFICE.

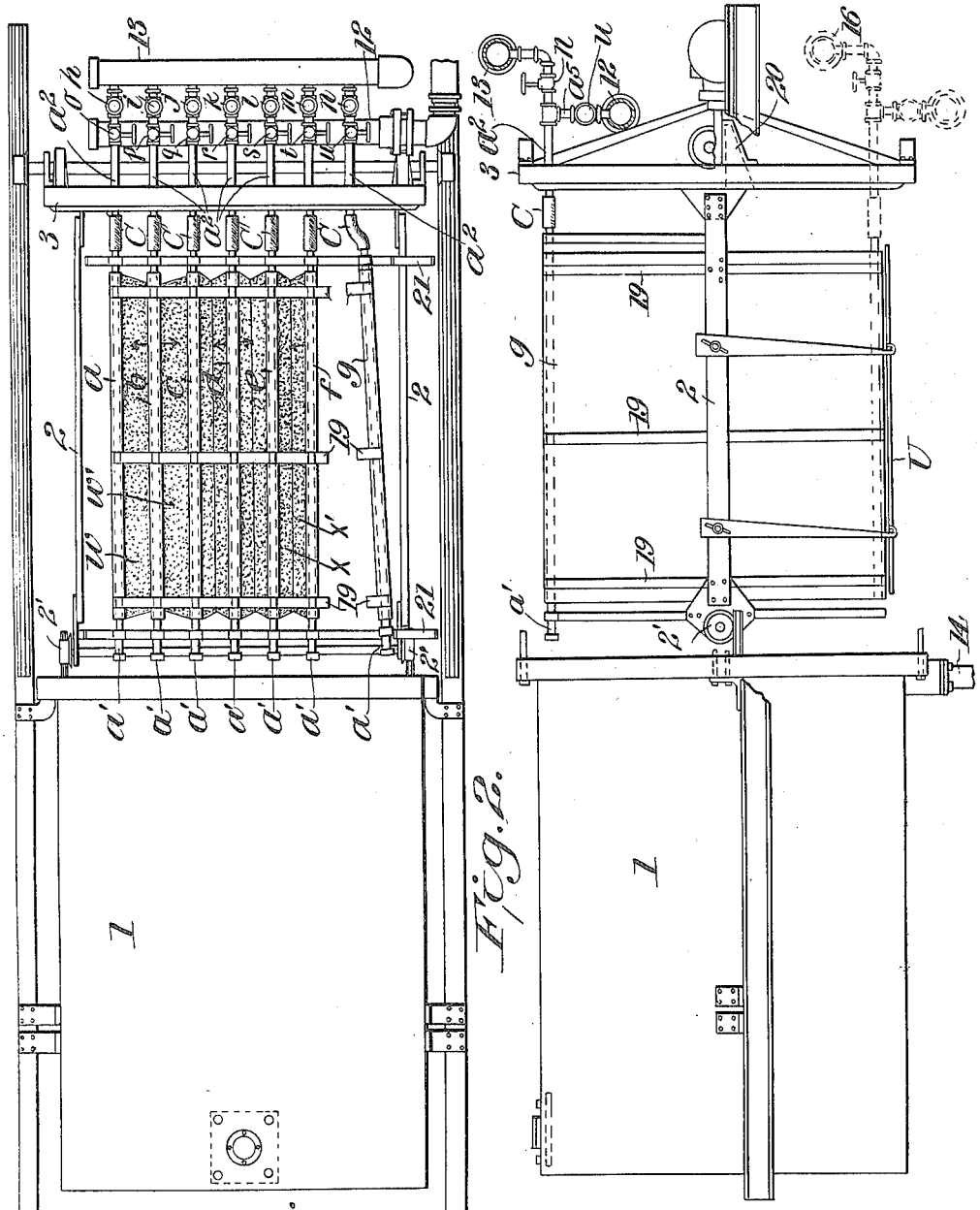

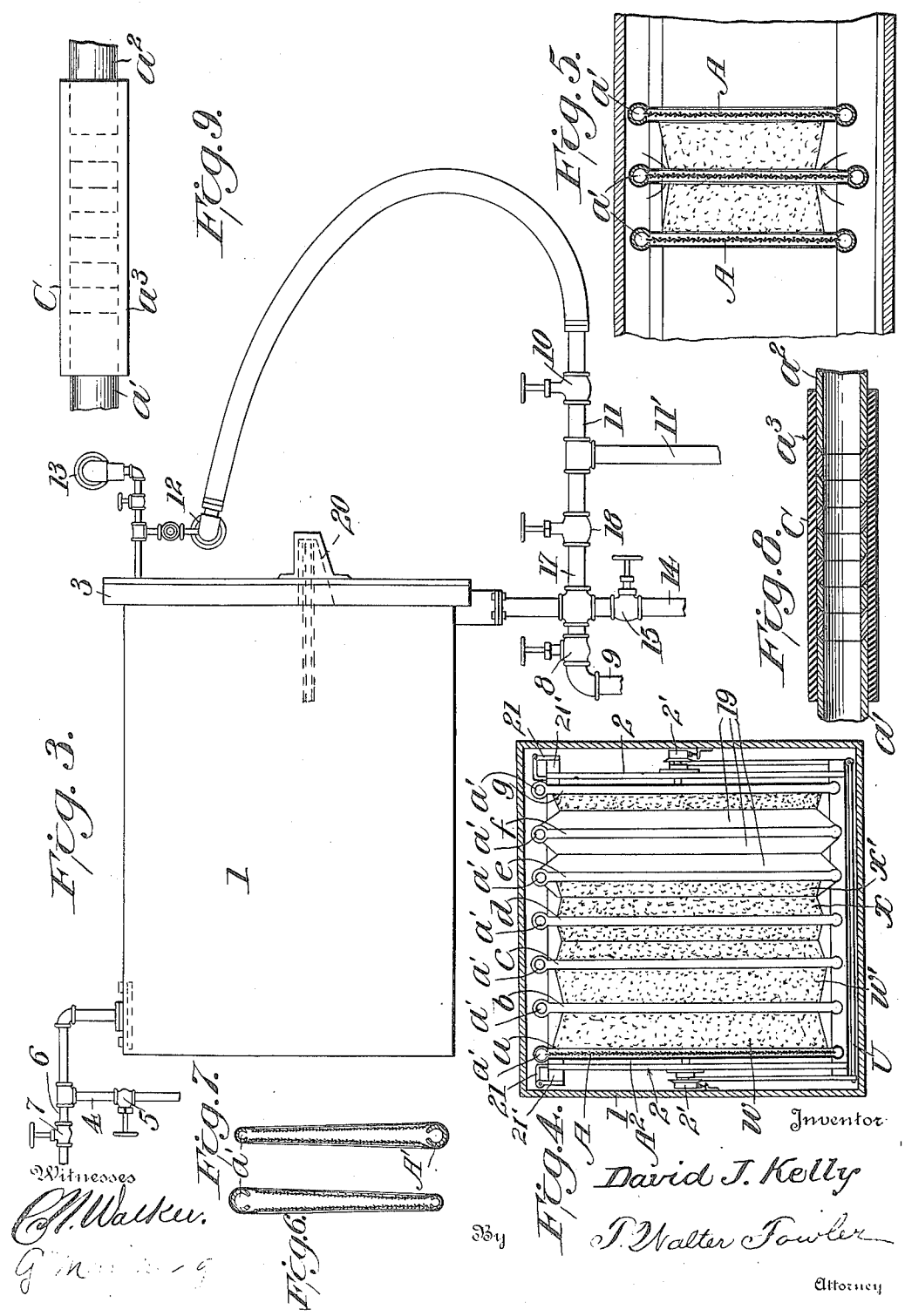

DAVID J. KELLY, OF SALT LAKE CITY, UTAH, ASSIGNOR TO KELLY FILTER PRESS COMPANY, OF SALT LAKE CITY, UTAH, A CORPORATION OF UTAH.

FILTERING APPARATUS.

1,158,056.  Specification of Letters Patent.  Patented Oct. 26, 1915.

Application filed October 22, 1913. Serial No. 796,662.

*To all whom it may concern:*

Be it known that I, DAVID J. KELLY, a citizen of the United States, residing at Salt Lake City, in the county of Salt Lake and State of Utah, have invented certain new and useful Improvements in Filtering Apparatus, of which the following is a specification.

This invention relates to certain new and useful improvements in filtering apparatus and the invention consists of the parts and the constructions, arrangements and combinations of parts which I will hereinafter describe and claim.

The present apparatus is adapted to the separation of liquids from solids, and is particularly designed to make dry cakes, that is, cakes containing a low percentage of moisture. It is well known that in closed tank filters of the type shown in my prior Patent No. 815,021, dated March 13, 1906, the general operation of the apparatus consists in building cakes to a thickness so that cakes on adjacent filtering frames, or elements, do not meet. This is done because it facilitates the impoverishment of the cakes by the application of a subsequent wash after the cakes have been built on the open filters; and it also provides for the discharge of the cakes. The cakes built upon an open-leaf filter frame, or element, contain a higher percentage of moisture than cakes built solid between adjacent filtering frames, or elements. The solid cake has the advantage of being compacted into close space, whereas the cake built to one filter surface only and having its outer surface contacting with liquid is soft and contains a higher percentage of moisture.

The present invention also provides, in addition to making solid cakes, means for washing such cakes, or extracting the values therefrom. The practice heretofore has not been to build solid cakes, as before stated, from the fact that such cakes cannot be washed or impoverished in the usual manner in filters of the present type.

The present invention also provides a construction for shifting the filter frames, or elements in a sidewise direction in order to facilitate the discharge of the solid cakes, that is, cakes which are built solidly as a homogeneous mass from the side of one filter frame, or element, to the opposed side of an adjacent filter frame, or element. Heretofore, the filter frames, or elements, have been attached more or less rigidly to the tank in which they are contained, and no provision has been made, to my knowledge, for the side shifting of the filter frames, or elements, relatively to each other to provide for the discharge of the cakes. The shifting movement may or may not be employed according to conditions, as some solid materials after washing and air-blowing, contract to a sufficient degree to drop readily from the surface of the filter frames or elements, without shifting the same.

In the accompanying drawings forming part of this specification, and in which similar reference characters indicate like parts in the several views;—Figure 1 is a top plan view of a filtering apparatus embodying my invention and showing a filter frame carrier removed from the pressure tank. Fig. 2 is a side elevation of the same. Fig. 3 is a side elevation of the tank with the carrier inclosed therein showing the system of piping and valve control. Fig. 4 is a cross sectional view of the filter tank and the contained filter carrier. Fig. 5 is an enlarged sectional detail to be hereinafter referred to. Fig. 6 is an enlarged cross section of a filter frame embodying my invention and tapering in a downwardly direction. Fig. 7 is a similar view of a filter frame tapering in an upwardly direction. Fig. 8 is a sectional view of the flexible joint between the filter frame and the corresponding pipe connection. Fig. 9 is a side elevation of the same.

In the said drawings 1 represents a filter tank of suitable construction, design and capacity and which tank may be closed on all sides except one end. A slidable filter carrier, 2, is designed to be moved in and out of the filter tank and to facilitate this action the carrier is provided with wheels or rollers, 2', adapted to travel on tracks contained within and projecting from the filter tank, while other tracks outside of the tank and parallel therewith and extending for a considerable distance beyond the open end thereof, are made to accommodate other rollers in much the same manner and for the same purpose as disclosed in my aforesaid prior patent.

The filter carrier may be constructed in any manner suitable for the purpose and it has rigidly fixed to it a head, 3, which is designed to close the open end of the tank when the carrier has been moved into said tank and to be secured in place by any well known and appropriate type of locking head mechanism. As such mechanism forms no part of the present invention it is not illustrated in detail, it being sufficient that the mechanism shall include some arrangement by which the head may be securely locked to the tank to provide against any leakage and to insure the quick opening of the tank and the release of the filter carrier when occasion demands.

The filter carrier is provided with any desired number of filter frames, or elements, $a$, $b$, $c$, $d$, $e$, $f$ and $g$, arranged in parallel order and spaced from each other a suitable distance. Each filter element may consist of an interior foraminous plate, A, and fabric sides forming an inclosure therefor and a means for separating liquid matter from the more solid constituents of the material to be treated.

At either the top or the bottom, or at both the top and bottom, the filter frames carry longitudinally extending pipes, $a'$, which are slotted or open on one side to form a communication between the interior of the pipe and the space within the filter frame inclosed by the fabric sides thereof, said pipes being closed at the rear ends and having their forward ends appropriately supported near the head of the carrier, said head having fixedly secured therein suitable pipes, $a^2$, which are arranged in line with the pipes, $a'$, and are connected to the latter through the medium of some appropriate flexible coupling, C. One type of such coupling is shown in Figs. 8 and 9 as comprising a series of short tubular sections arranged between the adjacent ends of the pipes, $a'$ and $a^2$, and having cone-shaped or suitable ends fitting one within the other to form substantially a universal joint, said short tubular members and portions of the contiguous ends of the pipes, $a'$ and $a^2$, being covered by a rubber or other flexible sleeve, $a^3$. The purpose of this construction is to permit the forward ends of the filter frames to be flexibly connected with the discharge pipes, $a^2$, so that the filter frames, or elements, may be shifted in a sidewise direction, as indicated in the lowermost filter frame, of Fig. 1, to increase the space between the adjoining filter frames to facilitate the discharge of the solid cake formed between said frames, as I will hereinafter more fully describe.

The pipes, $a^2$, connecting with each of the pipes, $a'$, which conduct the liquid matter which has passed through the filter sides to the interior thereof, are provided with controlling valves, $h$, $i$, $j$, $k$, $l$, $m$ and $n$, and discharge their contents into a suitable header, 13. Each of the aforesaid pipes, $a^2$, has a lateral branch, $a^5$, and these branches are controlled by valves, $o$, $p$, $q$, $r$, $s$, $t$ and $u$, said branches connecting with a header 12.

While the pipes which lead the liquid from the interior of the filter to the header, 13, are shown as being arranged along the upper side of the filter frames, it is apparent that they may be arranged to take off the separated liquid from the bottom of the filter frames, or elements, as indicated by the dotted lines in Fig. 2, which arrangement has the advantage of completely draining the space between the filter cloths of each filter frame. It is immaterial, therefore, so far as my invention is concerned, whether the filtered liquid is removed at the top of the filter frames or elements, or from the bottom of the same.

From the upper side near one end of the tank, 1, a pipe, 4, extends and provides an escape for air displaced in the tank during the filling operation of the same, said pipe being provided with a controlling valve, 5. A pipe, 6, connects with the pipe, 4, and has a controlling valve, 7, the purpose of which will be hereinafter stated. From the bottom of the front end of the tank also projects a pipe 14 having a controlling valve, 15, and in this pipe is a coupling member to which is fitted a branch pipe, 9, having a controlling valve, 8. Another pipe, 17, is fitted to the coupling member and has a controlling valve, 18, said pipe, 17, being fitted to a T-coupling on a pipe, 11', and to which coupling is also connected a pipe, 11, having a controlling valve, 10, said pipe, 11, being connected by a flexible or other pipe to the manifold, 12, before described.

In order that the filter frame may be rigidly held in suitable spaced relation, I prefer to use some form of spacing elements, 19, fixed to the frames in abutting relation, as shown in Figs. 1, 2 and 4, and the special object of which will be hereinafter made clear.

In the head, 3, of the filter carrier I may also form a recess, 20, adapted to accommodate the projecting ends of the rails which extend beyond the front end of the tank, 1, and the projection of which rails provide for a greater end movement of the filter carrier than if the rails extended only flush with the front end of the tank. This additional forward movement permits a carrier to emerge far enough to allow the back ends of the filter frames, or elements, to be removed entirely from the tank, and thus the side shifting movement of the frames is facilitated when the discharge of the cakes is to be effected thereby.

The operation of my apparatus is substantially as follows: Slimes pulp or other material to be filtered is forced into the tank, 1, under pressure through the pipe, 14, controlled by the valve, 15, and the air displaced by the filling of the tank is exhausted through the pipe, 4, controlled by the valve, 5. When the tank, 1, is completely filled with slimes pulp, or other material, the valve, 5, controlling the air-exhaust pipe, 4, is closed and pressure begins to act upon the filtering elements, $a$, $b$, $c$, $d$, $e$, $f$ and $g$, causing a flow of the liquid through the fabric sides thereof and causing a deposit of solids to be arrested on the exterior surfaces of said frames, or elements. Filtration is continued until the flow of liquid from the filter elements practically ceases. Some materials filter more freely than others and I make the spaces between the individual filter frames, or elements, of a sufficient width to suit conditions. That is, with a free filtering pulp I may have a wider space than with a pulp which gives higher resistance to filtration. I, therefore, make the space between the filter frames, or elements, of such a width as to insure obtaining a solid cake in said spaces in an economical time limit. When the solid cakes have formed, I drain the excess unfiltered material from the tank, 1, by admitting compressed air through the pipe, 6, controlled by the valve, 7, and I open the valve, 8, in the pipe, 9, attached to the lower part of the tank. The withdrawal of this excess unfiltered material may or may not be essential according to the degree of wash desired. The unfiltered material surrounds the filter elements, but cannot enter them as the flow, before stated, has been practically stopped through the building of a solid cake. After this surplus unfiltered material is withdrawn the next step is to fill the tank, 1, with a suitable wash solution, which is allowed to enter the tank under pressure through the pipe, 17, controlled by the valve, 18, the air displaced during this filling operation passing out through the pipe, 4, as in the case of the filling of the tank with the slimes. When the tank is completely filled with the wash solution the valve, 5, is closed. The wash solution, under pressure, completely surrounds the filtering elements with their attached cakes, but cannot enter them, as in the case where the cakes are not built solid, and in order to effect the desired wash of the cakes, and to remove therefrom any values which remain in the cakes, I open the valve, 10, in the pipe, 11, leading to the manifold, 12, to which are connected the valve-controlled outlets $a^2$—$a^5$ from the individual filtering frames, or elements. In this operation the valves, $o$, $q$, $s$ and $u$ are closed and at the same time the valves, $i$, $k$ and $m$, controlling the alternate branched connections to the filter frames, or elements, $b$, $d$, and $f$, are closed. This permits the wash solution to enter the interior of the filter frames, or elements, $b$, $d$ and $f$, through the valves, $p$, $r$ and $t$, which are left open, and causes a distribution of the wash solution throughout the entire interior of the filter frames, or elements, $b$, $d$ and $f$. The valves, $h$, $j$, $l$ and $n$ of the alternate series of filter frames, or elements, $a$, $c$, $e$ and $g$ are left open and accordingly it is obvious that the solution under pressure in order to find an exit must pass through the solid cakes, following the direction of the arrows in Fig. 1, thus displacing the values contained in the cakes, and remaining after the first expression of liquor or after the cake-building operation. The wash is continued to any desired point, after which the valve, 18, controlling the flow of wash solution to the tank should be closed, and also the valve, 10, in the pipe, 11, leading to the manifold, 12. The tank, 1, is now drained in the same manner as with the slimes pulp. If the wash is performed without draining the excess unfiltered material, after the cake-building operation, then the cakes may be washed without the withdrawal of this excess material, the operation being the same as before described, with the exception of the withdrawal of the excess material and the filling of the tank with the wash solution.

If it is desired to air-blow the cakes to further reduce the moisture, this may be accomplished by permitting air to enter through the same channels as were used for making the wash, that is, compressed air is permitted to enter the tank through the valve, 18, and also through the valve, 10, controlling the pipe, 11, connected with the manifold, 12. The compressed air remaining in tank, 1, can now be exhausted by opening the valve, 5. The apparatus can now be opened for the discharge of the cakes, and this is done by unlocking the head, 3 of the carrier, and withdrawing the carrier from the tank, which may be done by gravity, as described in my aforesaid prior Patent Number 815,021, or I may employ any suitable mechanical means which will cause or permit the carrier to emerge, or be removed from the tank.

When the carrier has been completely withdrawn from the tank, as shown in Fig. 1, the cakes built solid between the filter frames, or elements, may be quickly dropped by pulling or forcing the frames or elements sidewise, as indicated at the lower portion of Fig. 1, which operation increases the space between adjacent filter frames to a width greater than the thickness of the interposed cake, and thus permits the cake to drop from between the frames, or elements. After the cakes have been discharged the filter elements are returned to their original position, the carrier returns to the tank and is clamped into place, and the apparatus is again ready for another cycle of operations.

I have heretofore described one method by which I can wash solid cakes in a filter of the open-leaf type, and it will be noted that if all of the filter frames, or elements, are allowed to express liquid, the solid cakes which eventually form between the adjacent leaves, consist of two cakes, the outer faces of which eventually meet to form one solid cake. This is the method of cake-building employed in the well known plate-and-frame type of filter presses, but I have no knowledge of its ever having been used in a filtering apparatus of the open-leaf type.

It is apparent that the apparatus may be operated in other ways than those before described. For instance, if it is found undesirable to build cakes on all of the filter frames, or elements, and which cakes will eventually meet to form solid cakes, as represented at $x$ and $x'$, of Fig. 1, I can shut off the alternate filter elements and prevent any outflow of the liquid therefrom, in which case a cake will form on the remaining filtering elements, the outlets of which are allowed to remain open. The cakes forming on these latter filtering elements will eventually build sufficiently thick to form a solid cake in the space between their exterior surfaces and the adjacent filtering elements.

It is apparent that if the wash solution is forced through the filtering elements, which have been closed during the filtering operation, the wash will pass through the cakes on adjacent leaves in the same direction as the filtered liquid passed during the filtering operation, as illustrated by the cakes, $w$ and $w'$, in Fig. 1.

In Fig. 5 I have shown a modification of the apparatus previously described. In this instance the series of alternate filtering elements not used for cake-building can be made in a manner such that their outer edges will project into the wash solution as it enters the submerging tank. This provides a means for the wash solution to enter the interiors of these filter frames, or elements, without conveying the solution through the outside manifold.

If the cakes show any tendency to drop off the filtering elements after the pressure has been relaxed, I provide means for overcoming this. For instance, as shown in Fig. 7, I taper the filter frames, or elements, in such a manner as will make the spaces at the bottom smaller than those at the top, or a pipe $A'$ may be employed at the bottom of the filtering elements which has a larger diameter than the body of the element itself. In this manner it is obvious that a constricted opening may be had in the lower part of the spaces between the filtering elements, which will not permit the cakes to drop before the carrier is withdrawn from the tank. In some cases the cakes hang with greater tenacity than others, and when this occurs, I prefer to use a filtering element with a smaller width at the bottom than through the body of the element. In other words, I use a wider opening at the bottom between adjacent frames, or elements, than that space between the body of said element. I can also employ a hinged door U, to prevent the cakes dropping prematurely on the bottom of the tank. This can be placed immediately below the filtering elements and out of contact with the filter tank, said door being mounted on the filter carrier so that it may be dropped when the carrier is withdrawn.

In some cases the cakes may be discharged by forcing air or some other fluid to the interior of the filter elements, which will cause the bags or flexible sides to inflate, thereby crowding them apart to a degree sufficient to allow the cakes to drop freely by gravity. If a clogging tendency of the filtering fabric is evidenced by virtue of the slimes particles becoming embedded in the pores of the same, then I prefer to force the wash solution to the interiors of the filtering elements, which have not been used for this purpose for a cycle or more of operations. This reverse current has a cleansing effect. It is obvious that the alternate filtering elements which have been used to convey the wash solution to the cakes, may be employed for cake-building during any other cycle.

The filtering elements adjacent the sides of the tank are intended to form a cake only on the inner side and I make provision to place an impervious medium on the outside thereof. This may be accomplished by using oilcloth or sheet metal, $A^2$ or any other impervious medium suitable for the requirements. I also prefer to use a similar medium along the upper and lower edges of the filtering elements, to prevent the cake from forming along the bottom edges where it would have a greater tendency to drop than that portion of the cake which is formed upon the body of the filtering elements, and to prevent the formation of the cake at the top of the elements where it cannot be readily discharged. I have also observed that in some instances when solid cakes begin to form and the spaces between the filter frames are unequal, the narrower spaces will fill first and the tendency is for the filtering elements to push together more or less on account of the balance of pressure on their opposite sides being destroyed. To overcome this I have provided means to prevent the filtering elements becoming forced together in this manner, thereby eliminating the formation of unequal cake thicknesses, and also providing a means for holding the frames at equal distances apart. This means may consist simply of the fillers or spacers, 19, heretofore referred to, and which are attached to the filtering elements and which prevent any side movement of the elements during the filtration or cake building.

To prevent spreading of the filtering elements during filtration and the wash period, I may provide a hinged rod 21, which may be thrown over to contact with a supporting plate, 21', Fig. 4, in such a manner that the ends come into contact with the outer filtering elements and prevent their spreading. The front ends and lower corners of the elements may be held in a similar manner if desired.

Having thus described my invention what I claim as new and desire to secure by Letters Patent is:—

1. A filtering apparatus of the open-leaf type having in combination a pressure tank, a carrier removably contained therein and adapted to be surrounded by the contents thereof, said carrier being provided with a plurality of filtering elements arranged in spaced relation and between the opposed surfaces of which a solid cake of deposited material is adapted to be built, each of said filtering elements being subjected to the common pressure of said tank, and means for admitting a wash solution to the interior of alternate of said filtering elements, whereby values retained in the cakes are displaced and conducted by the wash solution into the interior of the intermediate filtering elements.

2. A filtering apparatus of the open-leaf type having in combination a pressure tank, a carrier removably contained therein and adapted to be surrounded by the contents thereof, said carrier being provided with a plurality of filtering elements submerged in the contents of the tank and arranged in spaced relation and between the opposed surfaces of which a solid cake of deposited material is adapted to be built, each of said filtering elements being subjected to the common pressure of said tank, and means for admitting a wash solution to the interior of alternate of said filtering elements, whereby values retained in the cakes are displaced and conducted by the wash solution into the interior of the intermediate filtering elements, said intermediate filtering elements having outlets leading from their interiors to a point outside of the tank.

3. A filtering apparatus comprising a fluid-containing pressure tank, a plurality of filtering elements arranged in spaced relation therein and between the opposed surfaces of which a solid cake of deposited material is adapted to be built, each of said filtering elements being subjected to the common pressure of said tank, and means for admitting a wash solution under pressure to the interior of alternate of said elements, whereby the solution is caused to pass through the cakes to wash the same and convey the values displaced from the cakes to the interior of the intermediate filtering elements.

4. A filtering apparatus comprising a fluid-containing pressure tank, a plurality of filtering elements arranged in spaced relation therein and between the opposed surfaces of which a solid cake of deposited material is adapted to be built, each of said filtering elements being subjected to the common pressure of said tank, means for admitting a wash solution under pressure to the interior of alternate of said elements, whereby the solution is caused to pass through the cakes to wash the same and convey the values displaced from the cakes to the interior of the intermediate filtering elements, and means for conducting the wash solutions and their values from the interior of the intermediate filtering elements to a point outside of the tank.

5. A filtering apparatus comprising a pressure tank into which the material to be filtered is delivered, a series of spaced filtering elements in said tank and between the opposed surfaces of which a solid cake of deposited material is adapted to be built, each of said filtering elements being subjected to the common pressure of said tank, said filtering elements having outlets for the filtered liquid, a receiver into which the outlets deliver liquid, means connecting with said outlets for admitting a cake cleansing solution to the interior of alternate filtering elements, valves for cutting off the intermediate elements from the cleansing solution supply, and other valves in the outlets for opening communication between said intermediate filtering elements and said receiver whereby the wash solution and the values displaced from the cakes are conducted to the receiver from the intermediate filtering elements.

6. A filtering apparatus comprising a pressure tank into which the material to be filtered is delivered, a series of spaced filtering elements in said tank and between the opposed surfaces of which a solid cake of deposited material is adapted to be built, each of said filtering elements being subjected to the common pressure of said tank, means for conveying a cleansing fluid to the interior of alternate filtering elements, whereby said fluid is caused to pass through the cakes to displace the values contained therein, and means for drawing off the liquid displaced from the cakes through the filtering elements which are intermediate of the first-named elements.

7. In a filtering apparatus, the combination with a pressure tank, a filter carrier removably contained therein and having filtering elements adapted to be submerged in the contents of the tank, each of said filtering elements being subjected to the common pressure of said tank, said elements adapted to build a solid cake of deposited material between the opposed surfaces of adjoining elements, and means for laterally shifting the position of the filtering elements with respect to each other to increase the space between adjacent elements to allow for the discharge of the deposited cake.

8. In a filtering apparatus, the combination with a pressure tank, a filter carrier removably contained therein and having filtering elements adapted to be submerged in the contents of the tank, each of said filtering elements being subjected to the common pressure of said tank, said elements adapted to build a solid cake of deposited material between the opposed surfaces of adjoining elements, and means permitting the filtering elements to be shifted flatwise toward and from each other to increase the width of the space between the sides of adjacent elements and to allow the deposited cake to be discharged.

9. In a filtering apparatus, the combination with a tank, a filter carrier movable into and out of the same, and a series of filtering elements on said carrier, each of said elements having filter sides and hollow interiors and having an outlet for the discharge of filtered liquid, and said elements having flexible couplings which permit them to be shifted flatwise one relatively to another to facilitate the discharge of the deposited cake.

10. In a filtering apparatus, the combination with a tank, of a carrier movable into and out of the same, filtering elements on said carrier having hollow interiors and filtering sides and having outlets for the filtered liquid, and means permitting the shifting of said elements flatwise one relatively to the other to provide a space between adjacent elements wider than the thickness of the cake formed between the elements.

11. In a filtering apparatus, the combination with a tank, a carrier movable into and out of the same, a series of filtering elements on said carrier adapted to be submerged in the contents of the tank, said elements having hollow interiors and filtering sides and having outlets leading the filtered liquid from their interiors, means on said elements for holding the elements rigidly in fixed spaced relation, and releasable means engaging said elements to prevent the spreading of the same during the filtration and subsequent cleaning of the cake.

12. In a filtering apparatus, the combination with a tank, a carrier movable into and out of the same, a series of filtering elements on said carrier adapted to be submerged in the contents of the tank, said elements having hollow interiors and filtering sides and having outlets leading the filtered liquid from their interiors, means on said elements for holding said elements rigidly in fixed spaced relation, and means permitting the separation of the elements laterally from the cake to provide a space between adjacent elements wider than the thickness of said cake, whereby the discharge of the cake is facilitated.

13. In a filtering apparatus, the combination with a tank, of a carrier movable into and out of the same, filtering elements on said carrier having hollow interiors and filtering sides and having filtered-liquid outlets leading from their interiors, said filtering elements tapering in thickness in a vertical direction to make a space wider at one end than the other.

14. In a filtering apparatus, the combination with a tank, of a carrier movable into and out of the same, filtering elements on said carrier having hollow interiors and filtering sides and having filtered-liquid outlets leading from their interiors, said filtering elements being thicker at the upper ends than at the lower to provide a space between adjacent elements which expands at the lower end to facilitate the cake discharge when pressure on said elements is released.

15. In a filtering apparatus, the combination with a tank, open at one end, a carrier movable into and out of the tank and having a head at one end adapted to close the open end of the tank when the carrier is in place in said tank, rails upon which the carrier is movably supported, and a recess in the head of the carrier adapted to accommodate the projecting ends of the rails where they extend beyond the front end of the tank.

In testimony whereof I affix my signature in presence of two witnesses.

DAVID J. KELLY.

Witnesses:
C. B. Felt,
G. F. Summers.